United States Patent [19]

Hönel et al.

[11] Patent Number: 5,135,970
[45] Date of Patent: Aug. 4, 1992

[54] USE OF CROSSLINKED POLYMER MICROPARTICLES IN PAINTS AS FILLER SUBSTITUTE AND/OR AS CROSSLINKING FILLER

[75] Inventors: Michael Hönel; Gerd Walz, both of Wiesbaden; Peter Ziegler, Mainz; Uwe Kubillus, Wiesbaden, all of Fed. Rep. of Germany

[73] Assignee: Hoechst AG, Fed. Rep. of Germany

[21] Appl. No.: 590,166

[22] Filed: Sep. 28, 1990

[30] Foreign Application Priority Data

Sep. 30, 1989 [DE] Fed. Rep. of Germany ....... 3932816

[51] Int. Cl.$^5$ .......................... C08L 63/00; C08K 3/20
[52] U.S. Cl. .................................... 523/414; 523/415; 523/417; 523/420
[58] Field of Search ................ 523/414, 415, 417, 420

[56] References Cited

U.S. PATENT DOCUMENTS

| | | | |
|---|---|---|---|
| 4,069,186 | 1/1978 | Ramig | 524/497 |
| 4,408,008 | 10/1983 | Markusch | 524/591 |
| 4,539,363 | 9/1985 | Backhouse | 524/522 |
| 4,855,164 | 8/1989 | Burkholder et al. | 524/539 |
| 4,894,399 | 1/1990 | Rody et al. | 524/336 |

*Primary Examiner*—Paul R. Michl
*Assistant Examiner*—Patrick Niland
*Attorney, Agent, or Firm*—Bierman and Muserlian

[57] ABSTRACT

The invention relates to the use of crosslinked polymer microparticles having an average particle size of at most 5 μm and a glass transition temperature (Tg) of at least +30° C. in aqueous paint preparations as filler and/or as partial substitute of white pigments, in particular of titanium dioxide.

Among other things, the corresponding paints show increased spreading power, less tendency for sedimentation and reduced crater formation.

14 Claims, No Drawings

USE OF CROSSLINKED POLYMER MICROPARTICLES IN PAINTS AS FILLER SUBSTITUTE AND/OR AS CROSSLINKING FILLER

DESCRIPTION

The addition of white pigments, such as titanium dioxide, for brightening the color and as filler in paints, in particular aqueous electrocoating compositions and filler paints for the automotive sector is sufficiently well-known. Among other things, their disadvantage is that, due to the relatively high specific weight of some white pigments, in particular titanium dioxide, the (specific) weight of the paint and the resulting paint film is quite substantial and the paint yield is not always satisfactory. Furthermore, the price of titanium dioxide is in particular fairly high. In addition, the tendency of painting systems of this type to form sediments is troublesome for many practical uses and the bonding of the white pigments in the cured paint film is not always sufficient.

There was therefore a need for eliminating these disadvantages completely or at least in part and for replacing in particular the white pigments, especially titanium dioxide, in paints at least in part by substances of less specific weight and lower cost without deterioration in the properties of the paint, such as application and flow properties and stone chip resistant, corrosion protection and adhesion on the intermediate layer.

To achieve this object, the invention proposes the use of crosslinked polymer microparticles having an average particle size of at most 5 μm and a glass transition temperature (Tg) of at least +30° C. as filler and/or as partial substitute of white pigments in aqueous paint preparations.

The invention furthermore relates to an aqueous dispersion, which is stable to flocculation, of crosslinked polymer microparticles having average particle sizes of at most 5 μm, a crosslinked polymer microparticles content of at least 20% by weight, relative to the dispersion of a glass transition temperature (Tg) of at least +30° C. in which the crosslinked polymer microparticles have been prepared by reaction of epoxy-containing compounds (a) with polyamines (b), and in which the functionality of (a) is greater than one and of (b) is equal to or greater than two.

Finally, the invention also relates to aqueous paint preparations which may contain white pigments and other customary paint additives and which contain the above aqueous dispersions or the crosslinked polymer microparticles isolated therefrom.

The crosslinked polymer microparticles (microgels) serve, as mentioned, according to the invention as partial substitute of white pigments in paints, in particular those based on water, and in some cases also as crosslinking fillers and as filler for transparent lacquers.

The white pigments preferably have a predominantly spherical particle shape and a specific weight of at least 2.0, in general of at least 4 g/cm$^3$. The white pigment is in particular titanium dioxide. In addition, basic lead silicate, lithopone, zinc oxide, bentones, zinc sulfide and fillers such as talc, kaolin, mica, feld spar, BaSO$_4$ (blanc fixe), CaSO$_4$, CaCO$_3$ and CaO are suitable. Since the microgels used according to the invention also have a predominantly spherical particle shape, no substantial change in the rheological properties of the paint system takes place as a result of the partial substitution, which is at least 10–100% by weight, preferably 15–90% by weight and in particular 22–85% by weight of the amount of white pigment (titanium dioxide) usually present.

Suitable water-based paints—which here means that they contain at most 20% by weight, preferably at most 10% by weight, relative to water, of conventional paint solvents —are in particular the customary electrocoating compositions for the priming of automotive bodies. Electrocoating compositions of this type, in which in most cases cationic epoxyamine adducts, polyurethanes and polyureas, polyesters and mixed adducts or condensation products serve as binder resins, are described, for example, in German Offenlegungsschrift 3,644,371, 3,726,497, 3,809,655 and in European Offenlegungsschriften 234,395 and 301,293. Further suitable resins are disclosed in Journal of Coatings Technology, Vol. 54, No. 686, (1982), pp. 33 to 41 ("Polymer Compositions for Cationic Electrodepositable Coatings"), to which reference is also made.

Other paint systems in which white pigments can in part be substituted according to the invention by microgels are the known filler paints, which are applied in particular in the automotive industry as a coat between the primer and the topcoat and serve, on the one hand, for levelling out irregularities in the primer coat, which is intended to ensure excellent appearance of the topcoat and, on the other hand, to improve the stone chip resistance on the entire coating (cf. OMYA; Technische Mitteilung No. 316: "Wasserverdünnbare Füller für industrielle Anwendungen" [Technical Communication No. 316: "Water-dilutable Fillers for Industrial Applications"] EP-OS 249,727). Suitable binder resins for aqueous filler paints are binders according to EP-OS 249,727, EP-OS 269,828 and preferably polyurethane resins such as described in German Patent Application 3,828,157.

The addition of the microgels to the paint is preferably carried out in the form of an aqueous dispersion which is preferably stable to flocculation or also in the form of the isolated microgel, the microgel being isolated from the dispersion by known methods, such as precipitation by electrolytes, spray-drying or centrifuging. There are also several possibilities for the manner in which the microgel (isolated or as a dispersion) is added to the paint: on the one hand, it can be added to the binder resin dispersion or, alternatively, the microgel is first mixed with the pigment paste which comprises in a known manner pigment paste resins and the customary paint additives (pigments, fillers, catalysts and the like) before, during or preferably after the pigment grinding, and the pigment paste is then added to the binder resin dispersion. Furthermore, the microgel can also be added to the paint, although this is less preferred.

The average particle size (primary grain size) of the microgels according to the invention is preferably below 2 μm and in particular between 0.3 and 1.0 μm, and the glass transition temperatures (of the isolated microgels) are preferably at least 30° C. and in particular 50 to 140° C. Their specific weight is in general comparable to that of the binder resin used and is in general smaller than 1.5 g/cm$^3$.

In the case of the preferably used (aqueous) microgel dispersions stable to flocculation, the microgel content is in most cases 20 to 70% by weight, preferably 40 to 65% by weight and in particular 45 to 55% by weight, relative to the dispersion. The viscosity of the microgel dispersions is between 10 and 6,000 mPa.s and preferably between 10 and 2,000 mPa.s and in particular between 20 and 500 mPa.s (measured according to Brookfield at 25° C.).

Stable to flocculation is understood to mean that these dispersions do not show any (irreversible) sedimentation phenomena even over a period of several days, in most cases even over a period of several weeks and have a sieve residue of less than 50 mg/l, preferably 0 to 30 mg/l (filtration through a mesh width of 30 μm).

The microgels used according to the invention preferably contain active crosslinking centers which, however, are not yet effective at room temperature. Examples are hydroxyl groups, primary or secondary amino groups, carboxyl groups, blocked isocyanate groups (urethane groups) etc. or mixtures thereof, see also W. E. Funke, J. of Coatings Technol., Vol. 60 (No. 767), pp. 67–76 (1988). In this manner, by curing at elevated temperature, if appropriate in the presence of a catalyst, the microgel is incorporated particularly firmly in the cured paint films and also acts itself as crosslinking agent (crosslinking filler). In the simultaneous presence, for example, of hydroxyl groups and/or primary and/or secondary amino groups and of blocked isocyanate groups, the microgels are even self-crosslinking.

The blocked isocyanate groups which are preferably present as active crosslinking centers are incorporated in the microgel in a customary manner via partially blocked polyisocyanate. This can take place, for example, already in the precursors of the microgel, for example in the polyepoxides in the case of the preferred epoxidebased microgels, or only in the ready-to-use microgel. Naturally the requirement is that these precursors or the ready-to-use microgel contain groups suitable for the reaction with the partially blocked polyisocyanate. Polyisocyanates which can be used are the polyisocyanates known in the polyurethane and paint sector, for example aliphatic, cycloaliphatic or aromatic polyisocyanates. Typical examples of polyisocyanates of this type are: xylylene diisocyanate, diphenylmethane 4,4'-diisocyanate, triphenylmethane 4,4',4''-triisocyanate, poly(phenylmethyl) isocyanate, 2-methylcyclohexyl 2,4(24,4)-diisocyanate, dicyclohexylmethyl diisocyanate, diethylfumarhexylisocyanate,bis(3-methyl-4-isocyanatocyclohexyl)methane, 2,2-bis(4-isocyanatocyclohexyl)propane, methyl esteroflysine diisocyanate, biuret of hexamethylene diisocyanate, diisocyanates of dimeric acids, 1-methylbenzene 2,4,5-triisocyanate, biphenyl 2,2,4'-triisocyanate, the triisocyanate from 3 mol of hexamethylene diisocyanate and 1 mol of water having an NCO content of 16% and further compounds containing at least two NCO groups per molecule, preferably isophorone diisocyanate, hexamethylene diisocyanate and tri- and tetramethylhexamethylene diisocyanate, but in particular 2,4- or 2,6-toluylene diisocyanate or mixtures of these compounds.

Apart from these simple polyisocyanates, also those isocyanates are suitable which contain hetero atoms in the radical linking the isocyanate groups. Examples of these are polyisocyanates having carbodiimide groups, allophanate groups, isocyanurate groups, urethane groups, acylated urea groups or biuret groups.

Suitable polyisocyanates are finally also the known prepolymers containing terminal isocyanate groups, such as are available in particular by reaction of the abovementioned simple polyisocyanates, in particular diisocyanates, with excess amounts of organic compounds containing at least two groups reactive towards isocyanate groups.

The nature of the blocking agents should be such that they are again eliminated already at the preferred curing temperatures of 130° to 180° C., if appropriate in the presence of catalysts known for this.

Examples of blocking agents of this type are: aliphatic, cycloaliphatic or alkylaromatic (monohydric) alcohols, for example lower aliphatic alcohols, such as methyl alcohol, ethyl alcohol, the various propyl alcohols, butyl alcohols and hexyl alcohols, heptyl alcohol, octyl alcohol, nonyl alcohol, decyl alcohol and the like; methoxypropanol, (1- or 2-)propanol; furthermore unsaturated alcohols, such as allyl alcohols, propargyl alcohols, cycloaliphatic alcohols, such as cyclopentanol, cyclohexanol, alkylaromatic alcohols, such as benzyl alcohol, 2-pyridinylcarbinol, methyl- and p-methoxy- and p-nitrobenzyl alcohol and monoethers of glycols, such as ethylene glycol monoethyl ether, ethylene glycol monobutyl ether and the like. Further blocking agents are ketoximes, advantageously containing 3 to 20 carbon atoms, preferably 3 to 10 carbon atoms, such as acetone oxime, methyl ethyl ketone oxime (=butanone oxime), hexanone oxime (such as methyl butyl ketone oxime), heptanone oxime (such as methyl n-amyl ketone oxime), octanone oxime and cyclohexanone oxime, CH acidic compounds, such as alkyl malonates, acetoacetates and cyanoacetates having 1 to 4 carbon atoms each in the ester group, NH acidic compounds, such as caprolactam, pyrazoles, amino alcohols, such as diethylethanolamine and specific amines, such as dibutylamine. Of these, 2-ethylhexanol, butyl diglycol, butyl glycol, 3-methyl-3-methoxybutanol, pyridinylcarbinol, and butanone oxime are preferred.

The microgels used according to the invention are preferably prepared by reaction of epoxy-containing compounds (a) with polyamines (b), in which the functionality of (a) is greater than one, preferably 2–10, and in particular 2–3, and of (b) on statistic average two or greater than two, preferably 2.1 to 12 and in particular 3 to 8. This reaction of (a) with (b) is preferably carried out in an aqueous medium. Instead of the epoxy-containing compounds, it is also possible—although this is less preferred—to use the corresponding cyclocarbonato-containing compounds which are obtained from the r former in a known manner by reaction with $CO_2$ (cf. German Offenlegungsschriften 3,726,497, 3,644,373 and 3,644,372).

The molecular weight $M_n$ of the epoxy-containing compounds (a) (number average, determined by gel chromatography, PS standard) from (a) should be in general between 100 and 10,000, preferably between 150 and 3,500, and the epoxide equivalent weight between 100 and 10,000, preferably 150 and 1,500. The epoxy groups are preferably terminal, but in some cases compounds containing these groups in random distribution along the chain of the molecule and which can be prepared by emulsion copolymerization with the use of olefinically unsaturated compounds containing these epoxy groups, such as, for example, glycidyl esters of acrylic or methacrylic acid, can also be used as component (a).

Suitable epoxy-containing compounds (a) are polyepoxides containing on average more than one epoxy group per molecule. These epoxy compounds can be either saturated or unsaturated and aliphatic, cycloaliphatic, aromatic or heterocyclic and also contain hydroxyl groups. They can furthermore contain substituents which do not cause any interfering side reactions under the mixing or reaction conditions, for example alkyl or aryl substituents, ether groupings and the like.

These epoxy compounds are preferably polyglycidyl ethers based on polyhydric, preferably dihydric, alcohols, polyether diols, phenols, hydrogenation products of these phenols and/or of novolaks (reaction products of mono- or polyhydric phenols with aldehydes, in particular formaldehyde in the presence of acid catalysts). The epoxy equivalent weights of these epoxy compounds are preferably between 150 and 2,000, in particular between 170 and 500. Examples of polyhydric phenols are: resorcinol, hydroquinone, 2,2-bis(4-hydroxyphenyl)propane (bisphenol A), isomeric mixtures of dihydroxydiphenylmethane (bisphenol F), tetrabromobisphenol A, 4,4'-dihydroxydiphenylcyclohexane, 4,4'-dihydroxy-3,3'-dimethyldiphenylpropane, 4,4'-dihydroxy-diphenyl, 4,4'-dihydroxybenzophenone, 1,1-bis(4-hydroxyphenyl)ethane, 1,1-bis(4-hydroxyphenyl)isobutane,2,2-bis(4-hydroxy-tert.-butylphenyl)-propane,bis(2-hydroxynaphthyl)methane, 1,5-dihydroxynaphthalene, tris(4-hydroxyphenyl)methane, bis-(4-hydroxyphenyl) ether, bis-(4-hydroxyphenyl) sulfone and others and the chlorination and bromination products of the abovementioned compounds. Of these, bisphenol A is particularly preferred.

The polyglycidyl ethers of polyhydric alcohols are also suitable. Examples of such polyhydric alcohols are ethylene glycol, diethylene glycol, triethylene glycol, 1,2-propylene glycol, polyoxypropylene glycols (n=1-10), 1,3-propylene glycol, 1,4-butylene glycol, 1,5-pentanediol, 1,6-hexanediol, 1,2,6-hexanetriol, glycerol and 2,2-bis(4-hydroxycyclohexyl)propane.

It is also possible to use polyglycidyl esters of polycarboxylic acids which are obtained by the reaction of epichlorohydrin or similar epoxy compounds with an aliphatic, cycloaliphatic or aromatic polycarboxylic acid, such as oxalic acids, succinic acid, polyglycol diacids, adipic acid, glutaric acid, phthalic acid, terephthalic acid, dodecenylsuccinic acid, hexahydrophthalic acid, 2,6-naphthalinedicarboxylic acid and dimerized linolenic acid. Examples are diglycidyl adipate, diglycidyl phthalate and diglycidyl hexahydrophthalate.

A detailed listing of the suitable epoxy compounds can be found in the handbook "Epoxidverbindungen und Epoxidharze" [Epoxy Compounds and Epoxy Resins] by A. M. Paquin, Springer Verlag, Berlin 1958, chapter IV and in Lee, Neville "Handbook of Epoxy Resins", 1967, chapter 2. It is also possible to use mixtures of several epoxy compounds or even mixtures of polyepoxide compounds with monoepoxide compounds.

These epoxy-containing compounds (a) are preferably used in the form of aqueous dispersions which are stable to flocculation, the flocculation stability being effected by external emulsifiers (cf. U.S. Pat. No. 4,122,067 and EP-OS 81,163 and others) or preferably by internal emulsifiers randomly incorporated in (a). In the latter case, they are also called self-emulsified polyepoxides As a rule, they have an epoxy equivalent weight between 250 and 10,000 and represent condensation products of α) 50 to 80% by weight of an epoxy compound containing at least two epoxy groups per molecule and an epoxy equivalent weight of 100 to 2,000, β) 35 to 17% by weight of an aromatic polyol and γ) 15 to 3% by weight of a condensation product of an aliphatic polyol having an average molecular weight (Mw) of 200 to 20,000, with an epoxy compound having at least two epoxy groups per molecule and an epoxy equivalent weight of 100 to 2,000 and, if appropriate, of a mono- and/or polyisocyanate, in which the equivalent ratio of the OH groups to the epoxy groups is 1:0.85 to 1:3.5, preferably 1:0.85 to 1:1.5 or 1:1.8 to 1:3.5, the amount of any mono and/or polyisocyanates present is 0.05 to 5% by weight, relative to the amount of aliphatic polyol and epoxy compound, and the epoxy equivalent weight of this condensation product is between 200 and at least 50,000 or preferably between 400 and 10,000 or at least 100,000.

Examples of self-emulsifying polyepoxides (a) of this type and the corresponding dispersions are described in German Offenlegungsschrift 3,643,751 and 3,820,301 and in EP-OS 51,483, to which reference is made here.

The aqueous dispersions of the polyepoxides (a) can, if desired, already contain customary paint additives, such as, inter alia, curing agents (for example fully blocked polyisocyanates).

As already mentioned above, these polyepoxides (a) may already contain active crosslinking centers, in particular hydroxyl groups and/or blocked isocyanate groups.

The polyamines (b) preferably have a functionality of greater than two, in particular 3 to 8, a primary amino group acting difunctionally towards (a), as it can react twice with an epoxy group. The polyamine is preferably water soluble. Apart from primary and/or secondary amino groups in accordance with the above functionality, (b) can contain other groups, such as blocked (primary) amino groups (ketimine groups), tertiary amino, OH, SH groups and amide groups (polyamidoamine). Other curing agents known for epoxy resins, such as Mannich bases, adducts of amines with polymers, such as polyepoxides, and melamine derivatives, piperazines, polyoxyalkyleneamines and the like are also usable as polyamines (b). It is also possible to use mixtures of various polyamines (b), in particular amines having blocked amino groups are used, in order to adjust the average functionality to the desired value.

Examples of polyamines (b) of this type are as follows: isophoronediamine, the adduct of 1 mol of isophoronediamine with 1 mol of acrylonitrile; ethylenediamine, diethylenetriamine and higher homologs, such as, for example, pentaethylenehexamine; hexamethylenediamine; 2-methylpentamethylenediamine; polypropylenedi- and -triamine (Jeffamine ®), trimethylhexamethylenediamine; bishexamethylenetriamine, N,N-dimethylaminopropylamine, N,N-diethylaminopropylamine; furthermore amines such as are described in DE 3,644,371; 2-ethylhexylamine, triacetonediamine, N-methyldipropylenetriamine, the reaction product of 2 mol of MIBK with 1 mol of triethylenetetramine, etc. Of these, m-xylylenediamine, bishexamethylenetriamine, neopentanediamine and cyclohexane-1,2-diamine are very particularly preferred.

As for further suitable polyamines, reference may be made to the already mentioned German Offenlegungsschrift 3,820,301.

To prepare an aqueous microgel dispersion from (a) and (b), the polyepoxide dispersion, the average particle size of which is advantageously not more than 1.0 μm, preferably 0.3 to 0.8 μm, is in general initially introduced at about 20° to 80° C., preferably at 50–90° C. and in particular at 60–80° C., and the polyamine (b) is added over a period of 1 to 60, in particular 1-5 minutes. This mixture is then thoroughly stirred, for some time, in general about 1 to 6 hours at room temperature or elevated temperature, as a rule at about 20° to 95° C. The amount of (b) depends on the epoxy equivalent weight of the epoxy resin dispersion and is such that 25 to 100% of the epoxy equivalent are reacted with amine, preferably 50 to 100% and very particularly preferably 90 to 100%. The microgel dispersions thus obtained, to which, if desired further paint additives, such as further fillers, pigments, catalysts and the like, may be added, are extremely stable to flocculation and do not show any sedimentation over a period of several days; in most cases, the particle size is at most 5 μm, preferably less than 2 μm and in particular less than 1 μm.

These microgel dispersions or the microgels isolated therefrom are sufficiently fine to allow use without any further grinding or milling; they can therefore be used directly as aqueous dispersion and thus allow greatly simplified handling and make it possible to adjust the pigment/binder ratio (PBR) to values which are variable within limits. The preferred ranges of the pigment/binder ratio, the name pigment being understood to represent the sum of all inorganic and organic pigments, fillers and the like, are 0.1:1 to 1.5:1 and very particularly preferably 0.15:1 to 0.6:1 (parts by weight=pbw).

As a result of the lower density (d. about 1) of the microgels (for comparison: titanium dioxide d. about 4), the paint systems are distinguished by a high spreading power, i.e. the attainable coating volume can be achieved with a significantly smaller weight of pigment than in the case of systems filled with inorganics.

Additionally it was found that microgels of this type also have excellent corrosion protection (560 h; ASTM-B 117-64; salt-spray test on Bonder 132—layer of 20 μm; subsurface migration at the cut less than 1 mm) and reduce crater formation.

EXAMPLES

All amounts given are in parts by weight.
The sieve residue and the "L metal sheet coating" were determined and carried out by the following procedure:

Sieve residue 1 l of the dilute coating solution was poured through a weighed Perlon sieve (mesh width 30 μm). The sieve was then rinsed with deionized water and after drying (1 h/125° C.) it was weighed. The difference of the two weighings gives the sieve residue in mg per 1,000 ml of bath.

"L metal sheet coating"

A zinc-phosphated steel sheet (about 10×20 cm) was bent at the lower end at a right angle (3 cm of horizontal area) and immersed in the coating bath in such a manner that the horizontal arm of the "L" is about 15 cm below the surface of the coating bath. The coating is carried out with the stirrer turned off and a coating time of 4 minutes. After the coating is completed, the metal sheet remained in the bath for another 2 minutes. The metal sheet was then removed from the bath, rinsed with water after another 2 minutes and baked. The metal sheet was evaluated visually with respect to flow, gloss and sedimentation phenomena.

(1) Preparation of the epoxy resin dispersions analogously to the process described in German Patent Application 3,820,301 (HOE 88/F 152)

(1.1) Preparation of the emulsifier (dispersant)

4,000 parts of PEG 4000 (about 1 mole, polyethylene glycol having an average molecular weight of about 4,000; HOECHST AG) were dehydrated with 971 parts of toluene at 130°-140° C. in a cycle. The solvent was then removed at 100°-120° C. in vacuo, and 5.2 parts of $HBF_4$ (50% in water) were added. 421 parts of Beckopox ® EP 140 (about 1.15 mole, diglycidyl ether of bisphenol A, EV about 183; HOECHST AG) are slowly run into this thoroughly stirred solution at 100°-130° C., and the mixture is kept at this temperature up to an EV of about 10,000.

(1.2) Preparation of the epoxy resins

[A] Parts (see Table 1 below) of the above solution were poured into a mixture comprising 366 parts of Beckopox ® EP 140, 110 parts of bisphenol A (about 0.48 mole) and 0.68 part of triphenylphosphine, the mixture was then heated to 150°-180° C. and kept at this temperature up to an epoxy equivalent weight (EV) in the range from a to b (see Table 1).

(1.3) Preparation of active crosslinking epoxy resins 596 parts of compound (3.1) (about 1.9 equivalents of NCO) are run into the epoxy resin melt obtained in (1.2) at 80°-100° C. over a period of 30-60 minutes, and the mixture is kept at this temperature up to an NCO value of virtually 0% (about 28.5% of TDI/solid resin). EV=a to b (see Table 1).

(1.4) Preparation of epoxy resins containing admixed fully blocked polyisocyanate (active crosslinking admixed curing agent: about 12.2% of TDI/solid resin)

416 parts of compound (3.2) are poured into the epoxy resin melt obtained in (1.2) at 80°-100° C. over a period of 20-40 minutes, and the mixture is kept at this temperature until a clear homogeneous solution had been obtained; the solvent was then evaporated off at 80° C. in vacuo.

EV=a to b (see Table 1).

(2) Preparation of the dispersion

The resin melts (1.2) to (1.4) were then diluted with [B]parts of methoxy-2-propanol at 80°-120° C. and dispersed at 60°-80° C. by pouring in [C] parts of deionized water with thorough stirring, and the mixture was filtered through a sieve having a mesh width of 70 μm.

TABLE 1

| (dn) | Dispersion | Resin melt | Parts [A] | [B] | [C] | $EV_1$ | $EV_2$ | S (%) | mPas (25° C.) |
|---|---|---|---|---|---|---|---|---|---|
| | | | | | | a to b | | | |
| <1 μm | (2.1) | (1.2) 529T | 53 | 120 | 368 | 505-525 | 970-1000 | 51-53 | 1500-2000 |
| <2 μm | (2.2) | (1.3) 1222T | 150 | 300 | 922 | 1160-1190 | 2320-2380 | 49-51 | 1800-2500 |
| <2 μm | (2.3) | (1.4) 867T | 100 | 200 | 667 | 820-840 | 1640-1680 | 49-51 | 2000-2700 | dn=average particle size
S=solids (1 g; 1 h, 125° C.)
$EV_1$=resin melt

EV$_2$ = dispersion

(3) Preparation of the (partially) blocked polyisocyanates (3.1) 124 parts (1.05 mole) of butyl glycol and 0.3 part of dibutyltin laurate (DBTL) were run into 174 parts of Desmodur ® T 80 (80% of 2,4-, 20% of 2,6-toluylene diisocyanate; about 1 mole) at 40°-60° C. over a period of 60-120 minutes, and the mixture is then kept at this temperature up to an NCO value of about 12.8-13.5%.

(3.2) 42.4 parts of trimethylolpropane were added in portions to 298 parts of the compound (3.1) in 146 parts of toluene, and the mixture was reacted at 80° C. up to an NCO value of virtually 0% (concentration of about 70%, 51% of TDI).

(4) Preparation of the microgel suspension

[D] parts (see Table 2 below) of the dispersions according to (2.1) to (2.3) were reacted at 40 to 80° C. with [E] parts of amine (Table 2) until an EV of greater than 100,000 had been reached. The mixture was then adjusted to a solids content of 50% with [F] parts of deionized water.

TABLE 2

| Microgel suspension | Dispersion | Parts [D] | [E] | [F] | Amine | dn (μm) | % of TDI solid | % of TDI disp. | Tg* (°C.) |
|---|---|---|---|---|---|---|---|---|---|
| (4.1) | (2.1) | 985 | 34 | 73.4 | mXDA | <1 | 0 | | 83 |
| (4.2) | (2.1) | 985 | 43 | 82.4 | BisH | <2 | 0 | | 80 |
| (4.3) | (2.2) | 2350 | 34 | 34 | mXDA | <1 | 27.7 | 13.85 | 55 |
| (4.4) | (2.2) | 2350 | 43 | 43 | BisH | <2 | 27.5 | 13.75 | 53 |
| (4.5) | (2.3) | 1660 | 34 | 34 | mXDA | <2 | 11.7 | 5.85 | 90 |

*The glass transition temperature was determined by DSC, using microgels which were purified by precipitation by electrolytes (2 parts of 0.5 N MgSO$_4$ solution per 1 part of dispersion) with deionized water and isolated and then dried at 30° C. (to constant weight) in a vacuum oven. In the clear supernatants, no amines could be detected.

mXDA = m-xylylenediamine (HAV f34)
BisH = bishexamethylenediamine (HAV f43)
HAV = amine equivalent weight
DSC = differential scanning calorimetry The isolated microgels were insoluble in the tested organic solvents (methoxy(ethoxy)-2-propanol, mixture of texanol/butyl glycol (1/1), ethanol, dimethyl diglycol, glacial acetic acid, acetone). Upon addition of water-miscible organic solvents, an aqueous suspension of the microgels showed an increase of dn to a constant end value by more than 30% (swelling of the microgels) over a period of 2 weeks.

(5) Testing of the microgels according to the invention (5.1) Preparation of the binder dispersion (5.1.1) Analogously to European Offenlegungsschrift 86

Example 31, an epoxy amine adduct was prepared: 210 parts of diethanolamine, 102 parts of N,N-dimethylaminopropylamine and 636 parts of an adduct of 1 mol of 2-methylpentamethylenediamine and 2 mole of the glycidyl ester of versatic acid (Cardura ® E10 from Shell) were added to 3,400 parts of bisphenol A epoxy resin (equivalent weight of about 480) in 2,341 parts of methoxy-2-propanol (about 65%). The reaction mixture was kept at 60 to 90° C. for 4 hours with stirring and then at 120° C. for one hour.

Hydroxyl number: about 155 mg of KOH/g of solid resin

Amine number: about 77 mg of KOH/g of solid resin.

(5.1.2) [A] Parts (see Table 3 below) of binder solution (5.1.1) were mixed with [B] parts of curing agent solution (3.2), 5 parts of texanol, 1.5 parts of 2-ethylhexanol and 2.3 parts of 50% aqueous formic acid (meq about 25), and the mixture was concentrated in vacuo (up to 20 mbar) at temperatures of up to 80° C. to a solids content of about 90%. A 40% dispersion was then prepared with 139 parts of deionized water with thorough stirring:

TABLE 3

| Binder dispersion | Parts [A] | [B] | dn (μm) | dw (μm) | % of TDI/ binder |
|---|---|---|---|---|---|
| (5.1.3) | 123.7 | 28.0 | 240 | 560 | 10.0 |
| (5.1.4) | 120.6 | 32.7 | 216 | 500 | 0 |

(5.2) Preparation of a paste resin and preparation of a pigment paste (analogously to European Patent Application 89,113,521.2 (HOE 88/F 183), Example I.B)

a) 1,708 parts (4 mole) of Denacol ® EX-145 (phenol(EO$_5$) glycidyl ether) are run into a solution of 204 parts (2 mol) of N,N-dimethylaminopropylamine in 1,224 parts of ethoxypropanol at 60°-80° C. over a period of one hour, and the mixture was then kept at 80°-100° C. until an Ep number of virtually 0 had been reached (amine number about 117 mg of KOH/g of solid; about 60%). 72 parts of deionized water and 400 parts of lactic acid (90%) were then run into this solution with cooling, and the mixture was then diluted to 60% with 128 parts of butyl glycol.

b) 1,280 parts (2 equivalents of epoxide) of Beckopox ® SEP 311 (75% in xylene) were heated to 80° C. 1,184 parts of the urethane (5.2.d) (75%) were then run into this solution over a period of one hour, and the mixture was kept at 80° C. until the NCO value was virtually 0%. The solvent was then removed in vacuo, and the mixture was diluted to about 60% with 1,232 parts of ethoxypropanol.

c) (5.2.a) was poured into the solution obtained in (5.2.b), and the mixture was kept at 60°-80° C. until an acid number and EP number of virtually 0 had been reached.

d) 540 parts of iso-octadecyl alcohol and 0.9 part of DBTL were run into 348 parts of Desmodur ® T 80 (80% of 2,4-, 20% of 2,6-toluylene diisocyanate) in 296 parts of xylene at 40°-60° C. over a period of one hour, and the mixture was then kept at this temperature up to an NCO value of about 9.5% (about 75%).

According to the formulation below, pigment pastes were prepared from the paste resin solution according to Example (5.2.c):

8.82 parts of dibutyltin oxide were added to [A] parts (see Table 4 below) of paste resin solution (60%), and the mixture was thoroughly homogenized at 40°-60° C. over a period of one hour, 10.30 parts of basic lead silicate paste (75% in water), 2.94 parts of color black Printex ® 25 and [B] parts of titanium oxide RSE 50 are then added, thoroughly homogenized and deionized water is added until milling viscosity is reached, and the mixture was then milled on a pearl mill (see above German Offenlegungsschrift P 3,726,497). This pigment prepaste was then mixed with [C] parts of the microgel suspension in a dispersing apparatus and adjusted to a solids content of S% with deionized water. The pastes were filtered through a sieve having a mesh width of 50 μm:

TABLE 4

| Paste | Microgel suspension | Pbw A | Pbw B | Pbw C | PBR (Pbw) Paste/Bath | Paste % of Pbw of microgel | x | Paste S (%) |
|---|---|---|---|---|---|---|---|---|
| a (5.2.1) | (4.1) | 32.0 | 92.9 | 65.8 | 7.7:1  0.35:1 | 22.2 | 0.5 | 65 |
| (5.3.2) | (4.1) | 32.0 | 23.7 | 105.4 | 5.1:1  0.06:1 | 53.3 | 0.8 | 65 |
| b (5.2.3) | (4.1) | 23.0 | 11.0 | 75.6 | 5.1:1  0.17:1 | 53.3 | 0.8 | 65 |
| c (5.2.4) | (4.1) | 38.8 | 93.8 | 66.6 | 6.4:1  0.35:1 | 22.2 | 0.5 | 65 |
| (5.2.5) | (4.1) | 38.8 | 24.0 | 106.4 | 4.3:1  0.24:1 | 53.3 | 0.8 | 65 |
| d (5.2.6) | (4.1) | 79.7 | 4.8 | 311.2 | 3.8:1  0.4:1 | 84.5 | 0.95 | 55 |
| e (5.2.7) | (4.1) | 70.0 | 14.2 | 410.4 | 5.8:1  0.55:1 | 84.5 | 0.95 | 55 |
| (5.2.8) | (4.2) | 32.0 | 92.9 | 65.8 | 7.7:1  0.35:1 | 22.2 | 0.5 | 65 |
| (5.2.9) | (4.3) | 35.0 | 36.7 | 134.3 | 6.0:1  0.3:1 | 53.2 | — | 65 |
| (5.2.10) | (4.5) | 31.4 | 7.2 | 318.0 | 10:1  0.45:1 | 84.4 | — | 55 |
| (5.2.11) | (comp. paste a) | 32.0 | 208.2 | — | 12:1  0.55:1 | — | — | 75 |
| (5.2.12) | (comp. paste b) | 23.0 | 143.4 | — | 12:1  0.40:1 | — | — | 75 |
| (5.2.13) | (comp. paste c) | 38.8 | 210.3 | — | 10:1  0.55:1 | — | — | 75 |
| (5.2.14) | (comp. paste d) | 79.6 | 549.3 | — | 12:1  1.28:1 | — | — | 75 |
| (5.2.15) | (comp. paste e) | 70.0 | 732.4 | — | 18:1  1.71:1 | — | — | 75 |

$0 < x < 1$, Degree of substitution of the pigment portion (P) replaced by the microgels (Mg) (by volume, relative to titanium oxide).

TABLE 5

| Tested combinations | 1,000 p of dispersion | p | Paste |
|---|---|---|---|
| 5.3.1 | 5.1.4 | 253.1 | 5.2.1 |
| 5.3.2 | 5.1.4 | 177.1 | 5.2.2 |
| 5.3.3 | 5.1.4 | 126.3 | 5.2.3 |
| 5.3.4 | 5.1.4 | 261.4 | 5.2.4 |
| 5.3.5 | 5.1.4 | 184.6 | 5.2.5 |
| 5.3.6 | 5.1.4 | 414.0 | 5.2.6 |
| 5.3.7 | 5.1.4 | 510.7 | 5.2.7 |
| 5.3.8 | 5.1.4 | 253.1 | 5.2.8 |
| 5.3.9 | 5.1.3 | 222.1 | 5.2.9 |
| 5.3.10 | 5.1.3 | 371.8 | 5.2.10 |
| 5.3.11 | 5.1.4 | 329.2 | 5.2.11 |
| 5.3.12 | 5.1.4 | 235.6 | 5.2.12 |
| 5.3.13 | 5.1.4 | 337.5 | 5.2.13 |
| 5.3.14 | 5.1.4 | 1,233.2 | 5.2.14 |
| 5.3.15 | 5.1.4 | 1,058.5 | 5.2.15 |

(5.3) The pastes were then added to dilute transparent paint (25% aqueous solution) of the cathodic electrocoating binder dispersion described in (5.1.4) and (5.1.6) with stirring, and the mixture was then adjusted to a solids content of 18% with deionized water (1 h, 125° C.) (test combinations Table 5, PBR Table 4). The test combinations were then subjected to cataphoretic deposition in an open glass vessel. A phosphated steel sheet served as the cathode (Bonder ® 26 from Chemetall) and, at a distance of 5 to 10 cm from the cathode, a polished steel sheet served as the anode. The bath temperature was 32° C. and the deposition time was 2 minutes.

Additionally, after 24 hours, 14 days and 4 weeks (stirring at room temperature), the sieve residue was determined and an "L metal sheet coating" was carried out.

The results are summarized in Table 6. The coated metal sheets were baked at an oven temperature of 170° C. (through-circulation) for 20 minutes.

TABLE 6

| Test comb. | Breakdown [V] | Layer [μm (300 V)] | VDA alternating test 10 cycles [mm] subsurface migration | Sieve residue [mg/l] after 24 h | 14 d | 4 w | L metal sheet after 24 h | 14 d | 4 w |
|---|---|---|---|---|---|---|---|---|---|
| 5.3.1 | 375 | 20 | 1–1.5 | <5 | 20 | 100 | OK | OK | sd |
| 5.3.2 | 375 | 21–23 | 1–1.2 | 10 | 30 | 50 | OK | OK | OK |
| 5.3.3 | 350 | 18–19 | 1–1.2 | 10 | 20 | 20 | OK | OK | OK |
| 5.3.4 | 375 | 17–18 | 1.2–1.5 | 5 | 30 | 60 | OK | OK | OK |
| 5.3.5 | 325 | 20–22 | 1–1.2 | <5 | 20 | 40 | OK | OK | OK |
| 5.3.6 | 325 | 22–23 | 1–1.2 | 20 | 20 | 60 | OK | OK | sd |
| 5.3.7 | 325 | 24–26 | 1–1.5 | 30 | 50 | 60 | OK | OK | OK |
| 5.3.8 | 375 | 20 | 1.5 | <5 | 20 | 30 | OK | OK | OK |
| 5.3.9 | 350 | 18–19 | 1.2–1.7 | 30 | 50 | 80 | OK | sd | sd |
| 5.3.10 | 325 | 18–20 | 1–1.5 | 50 | 80 | 100 | OK | OK | d |
| 5.3.11 | 350 | 18–19 | 1–1.5 | 50 | 80 | 100 | OK | OK | sd |
| 5.3.12 | 350 | 17–18 | 1.2–1.5 | 10 | 30 | 80 | OK | OK | OK |
| 5.3.13 | 350 | 18–20 | 1–1.5 | 20 | 50 | 90 | OK | sd | sd |
| 5.3.14 | 350 | 18–24* | 1.5–2.2 | 80 | 500 | 800 | sd | s | UNS |

TABLE 6-continued

| Test comb. | Breakdown [V] | Layer [μm (300 V)] | VDA alternating test 10 cycles [mm] subsurface migration | Sieve residue [mg/l] after 24 h | 14 d | 4 w | L metal sheet after 24 h | 14 d | 4 w |
|---|---|---|---|---|---|---|---|---|---|
| 5.3.15 | 350 | 18–24* | 2–2.5 | 70 | 450 | 1,000 | s | UNS | UNS |

*Film very wavy
OK = Coating OK, no sedimentation phenomena
sd = Slightly dull
d = Dull, slight sedimentation phenomena
s = Substantial sedimentation phenomena
UNS = Distinct flow defects, film is unsuitable.

(5.4) Preparation of an automotive water-based serial filler a) Hydrofiller based on an OH-functional polyurethane dispersion with the use of conventional pigments A mixture of 63.0 parts by weight of an OH-functional polyurethane dispersion (39%), 6.2 parts by weight of a melamine resin, 14.5 parts by weight of titanium dioxide CL 310 ® (Kronos Titan GmbH), 9.2 parts by weight of Blanc fixe micro ® (Sachtleben GmbH) and 6.2 parts by weight of Talkum Mistron Vapor (Chemag) is milled in a pearl mill at 6,500 revolutions per minute until the milled material has a fineness of less than 10 μm (about 30 minutes). The pH is adjusted to 8.3±0.2 with dimethylethanolamine. The efflux viscosity (DIN 53 211, 23° C.) of this hydrofiller is 70–80 s, the binder/pigment ratio is 1:1, the solids content (DIN 53 216) is about 53%. After adjusting the spraying viscosity to 28 s, (DIN 53 211) with water, 2 crosswise applications are performed by means of a pneumatic hand spraygun at a spraying pressure of 3 bar and 1 minute of waiting in between, the coating is predried at 80° C. for 10 minutes and finally baked at 165° C. for 15 minutes. The resulting coating has a gloss (60° angle) of 65–70%, and the pendulum hardness (according to König) is 50 s.

The stone chip resistance for the composition cathodic electroprimer, filler and topcoat (depending on the type of topcoat), evaluated by the VW method, gives a characteristic value of 1–3.

b) Hydrofiller based on an OH functional polyurethane dispersion with the use of microgel suspension (4.1) and (4.2)

A mixture of 63.0 parts by weight of an OH functional polyurethane dispersion VTW 1,220, 6.2 parts by weight of a melamine resin and 6.2 parts by weight of titanium dioxide CL 310 ® are placed in a pearl mill and milled at about 6,500 revolutions per minute until the milled material has a fineness of less than 10 μm (about 30 minutes). 12.3 parts by weight of the microgel suspension (4.1) are added with gentle stirring. If necessary, the pH is corrected to 8.2±0.2 with dimethylethanolamine, and the spraying viscosity is adjusted to 28 s (DIN 53 211) with deionized water. The pigment/binder ratio is 1:2.5, the pigment volume/binder volume ratio is 1:1, and the solids content is 41%. Coatings obtained from this hydrofiller (cf. Example a) have a gloss of 90% (60° angle), a pendulum hardness of 48 s according to König and, in the stone chip test using 1 kg of steel shot at a pressure of 2 bar, give characteristic values of 1–3.

c) Example b) is repeated, except that 15.4 parts by weight of titanium dioxide ® CL 310 instead of 6.2 parts by weight and 30.8 parts by weight of the microgel suspension instead of 12.3 parts by weight are used. The pigment/binder ratio of the hydrofiller thus prepared is 1:1, the pigment volume/binder volume ratio is 2.5:1, and the solids content (DIN 53 216) is 46%. Coatings produced with this hydrofiller have a gloss of 88% (60° angle) and a pendulum hardness of 61 s according to König. In the stone chip test, characteristic values of 1–3 are obtained.

d) Example b) is repeated, except that 12.3 parts by weight of the microgel suspension (4.2) are used instead of 12.3 parts by weight of the microgel suspension (4.1). The pigment/binder ratio is 1:2.5, the pigment volume/binder volume ratio is 1:1, and the solids content is 40%. Coatings produced from this hydrofiller give results which, with respect to gloss and characteristic values in the stone chip test, match those of Example a). In contrast, the pendulum hardness value is 30 s (according to König).

We claim:

1. An aqueous dispersion, which is stable to flocculation, of crosslinked polymer microparticles having average particle sizes of at most 5 μm, a crosslinked polymer microparticle content of at least 20% by weight, relative to the dispersion and a glass transition temperature (Tg) of at least +30° C., in which the crosslinked polymer microparticles have been prepared by reaction of self-emulsifying epoxy-containing compounds (a) having an epoxy equivalent weight between 250 and 10,000 and being condensation products of A) 50 to 80% by weight of an epoxy compound containing at least two epoxy groups per molecule and an epoxy equivalent weight of 100 to 2,000.

B) 35 to 17% by weight of a condensation product of an aliphatic polyol having an average molecular weight (Mw) of 200 to 20,000, with an epoxy compound having at least two epoxy groups per molecule and an epoxy equivalent weight of 100 to 2,000 and optionally a mono- and/or polyisocyanate, in which the equivalent ratio of the OH groups to the epoxy groups is 1:0.85 to 1:3.5, the amount of any mono- and/or polyisocyanates present is 0.056 to 5% by weight, relative to the amount of aliphatic polyol and epoxy compound, and the epoxy equivalent weight of this condensation product is between 200 and at least 50,000, with a polyamine B) and in which the functionality of A) is greater than one and of B) is identical to or greater than two.

2. An aqueous dispersion as claimed in claim 1, wherein the aqueous paint preparations are electrocoating compositions or filler paints.

3. An aqueous dispersion as claimed in claim 1, wherein the average particle size is in the range from 0.3 to 1.0 μm and the glass transition temperature is 60° to 140° C.

4. An aqueous dispersion as claimed in claim 1, wherein the crosslinked polymer microparticles contain active crosslinking centers.

5. An aqueous dispersion as claimed in claim 4, wherein blocked isocyanate groups which block under the curing conditions serve as active crosslinking centers.

6. An aqueous dispersion as claimed in claim 5, wherein the crosslinked polymer microparticles are additionally self-crosslinking.

7. An aqueous dispersion as claimed in claim 1, wherein the crosslinked polymer microparticles are used in the form of an aqueous dispersion which is stable to flocculation and which contains at least 20% by weight of crosslinked polymer microparticles, relative to the dispersion.

8. An aqueous dispersion as claimed in claim 7, wherein the epoxy-containing compounds (a) are self-emulsifying.

9. An aqueous dispersion as claimed in claim 1, wherein the polyamines (b) are m-xylylenediamine or bishexamethylenediamine, neopentanediamine or cyclohexanediamine.

10. An aqueous dispersion as claimed in claim 1, wherein the epoxy equivalent weight of the epoxy-containing compounds (a) used is 450 to 2,500.

11. An aqueous dispersion as claimed in claim 1, wherein the aliphatic polyols according to ($\gamma$) are polyalkylene glycols having molecular weights (Mw) of 600 to 12,000.

12. An aqueous dispersion as claimed in claim 1, wherein the amount of the crosslinked polymer microparticles is 40 to 65% by weight, relative to the dispersion.

13. An aqueous paint preparation which may contain white pigments and contains an aqueous dispersion as claimed in claim 1, or the crosslinked polymer microparticles isolated therefrom.

14. An aqueous paint preparation as claimed in claim 13, wherein the amount of crosslinked polymer microparticles (solid) is 15 to 90% by weight, relative to the white pigment.

* * * * *

UNITED STATES PATENT AND TRADEMARK OFFICE
CERTIFICATE OF CORRECTION

PATENT NO. : 5,135,970

DATED : Aug. 4, 1992

INVENTOR(S) : Michael Hönel; Gerd Walz; Peter Ziegler and Uwe Kubillus

It is certified that error appears in the above-identified patent and that said Letters Patent is hereby corrected as shown below:

Col. 14, claim 1, line 43,

"B) 35 to 17% by weight of a condensation product etc." should be

--B) 35 to 17% by weight of an aromatic polyol and

C) 15 to 3% by weight of a condensation product of--

Signed and Sealed this

Fifth Day of October, 1993

Attest:

BRUCE LEHMAN

*Attesting Officer*    *Commissioner of Patents and Trademarks*